(12) United States Patent
    Barnard

(10) Patent No.: US 12,620,162 B2
(45) Date of Patent: *May 5, 2026

(54) INTERSECTION TESTING FOR RAY TRACING

(71) Applicant: Imagination Technologies Limited, Kings Langley (GB)

(72) Inventor: Daniel Barnard, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 170 days.

This patent is subject to a terminal disclaimer.

(21) Appl. No.: 18/407,201

(22) Filed: Jan. 8, 2024

(65) Prior Publication Data

US 2024/0144582 A1     May 2, 2024

Related U.S. Application Data

(63) Continuation of application No. 17/490,784, filed on Sep. 30, 2021, now Pat. No. 11,869,133.

(30) Foreign Application Priority Data

| | | | |
|---|---|---|---|
| Sep. 30, 2020 | (GB) | .................................... | 2015490 |
| Sep. 30, 2020 | (GB) | .................................... | 2015495 |
| Sep. 30, 2020 | (GB) | .................................... | 2015507 |

(51) Int. Cl.
    *G06T 15/06* (2011.01)
    *G06T 17/00* (2006.01)

(52) U.S. Cl.
    CPC ............ *G06T 15/06* (2013.01); *G06T 17/005* (2013.01); *G06T 2210/12* (2013.01); *G06T 2210/21* (2013.01); *G06T 2210/52* (2013.01)

(58) Field of Classification Search
    CPC ............. G06T 2210/21; G06T 2210/52; G06T 2210/12
    See application file for complete search history.

(56) References Cited

U.S. PATENT DOCUMENTS

| | | | |
|---|---|---|---|
| 8,248,402 B2 | 8/2012 | Brown et al. | |
| 2008/0024489 A1* | 1/2008 | Shearer ................... | G06T 15/06 345/421 |
| 2008/0043018 A1 | 2/2008 | Keller et al. | |
| 2008/0074420 A1 | 3/2008 | Kuesel et al. | |
| 2009/0284523 A1 | 11/2009 | Peterson et al. | |
| 2010/0077010 A1 | 3/2010 | Aila et al. | |

(Continued)

FOREIGN PATENT DOCUMENTS

| | | |
|---|---|---|
| EP | 2784752 A2 | 10/2014 |
| EP | 3457362 A2 | 3/2019 |

(Continued)

*Primary Examiner* — Alicia M Harrington
*Assistant Examiner* — Christine Yera Ahn
(74) *Attorney, Agent, or Firm* — Potomac Law Group, PLLC; Vincent M DeLuca

(57) ABSTRACT

A system and method for performing intersection testing of rays in a ray tracing system. The ray tracing system uses a hierarchical acceleration structure comprising a plurality of nodes, each identifying one or more elements able to be intersected by a ray. The system makes use of a serial-mode ray intersection process, in which, when a ray intersects a bounding volume, a limited number of new ray requests are generated.

9 Claims, 6 Drawing Sheets

(56)        References Cited

U.S. PATENT DOCUMENTS

| | | | |
|---|---|---|---|
| 2011/0032257 | A1 | 2/2011 | Peterson et al. |
| 2015/0091894 | A1* | 4/2015 | Shin ........................ G06T 15/06 |
| | | | 345/419 |
| 2016/0314611 | A1 | 10/2016 | Shin et al. |
| 2017/0309061 | A1 | 10/2017 | Wang et al. |
| 2020/0051315 | A1 | 2/2020 | Laine et al. |
| 2020/0051324 | A1 | 2/2020 | Uludag |
| 2020/0211147 | A1 | 7/2020 | Doyle et al. |
| 2020/0211261 | A1 | 7/2020 | Janus et al. |
| 2021/0209832 | A1 | 7/2021 | Saleh et al. |
| 2021/0304489 | A1 | 9/2021 | Saeed et al. |
| 2021/0342996 | A1 | 11/2021 | Saleh et al. |
| 2021/0398340 | A1 | 12/2021 | Muthler et al. |
| 2021/0407175 | A1 | 12/2021 | Saleh et al. |
| 2022/0101590 | A1 | 3/2022 | Barnard |
| 2022/0101592 | A1 | 3/2022 | Barnard |

FOREIGN PATENT DOCUMENTS

| | | | |
|---|---|---|---|
| GB | 2463143 | A | 3/2010 |
| WO | 2008/091958 | A2 | 7/2008 |

* cited by examiner

INTERSECTION TESTING FOR RAY TRACING

CROSS-REFERENCE TO RELATED APPLICATIONS AND CLAIM OF PRIORITY

This application is a continuation under 35 U.S.C. 120 of copending application Ser. No. 17/490,784 filed Sep. 30, 2021, now U.S. Pat. No. 11,869,133, which claims foreign priority under 35 U.S.C. 119 from United Kingdom Application Nos. 2015490.2, 2015495.1 and 2015507.3 all filed Sep. 30, 2020, the contents of which are incorporated by reference herein in their entirety.

BACKGROUND

Ray tracing systems can simulate the manner in which rays (e.g. rays of light) interact with a scene. For example, ray tracing techniques can be used in graphics rendering systems which are configured to produce images from 3-D scene descriptions. The images can be photorealistic, or achieve other objectives. For example, animated movies can be produced using 3-D rendering techniques. The description of a 3D scene typically comprises data defining geometry in the scene. This geometry data is typically defined in terms of primitives, which are often triangular primitives, but can sometimes be other shapes such as other polygons, lines or points.

Ray tracing mimics the natural interaction of light with objects in a scene, and sophisticated rendering features can naturally arise from ray tracing a 3-D scene. Ray tracing can be parallelized relatively easily on a pixel-by-pixel level because pixels generally are independent of each other. However, it is difficult to pipeline the processing involved in ray tracing because of the distributed and disparate positions and directions of travel of the rays in the 3-D scene, in situations such as ambient occlusion, reflections, caustics, and so on. Ray tracing allows for realistic images to be rendered but often requires high levels of processing power and large working memories, such that ray tracing can be difficult to implement for rendering images in real-time (e.g. for use with gaming applications), particularly on devices which may have tight constraints on silicon area, cost and power consumption, such as on mobile devices (e.g. smart phones, tablets, laptops, etc.).

At a very broad level, ray tracing involves: (i) intersection testing, to identify intersections between rays and geometry (e.g. primitives) in the scene, and (ii) shading, which comprises performing some processing (e.g. by executing a shader program) in response to identifying an intersection to determine how the intersection contributes to the image being rendered. The execution of a shader program may cause further rays to be emitted into the scene. These further rays may be referred to as "secondary rays".

A lot of processing is involved in identifying intersections between rays and geometry in the scene. In a very naïve approach, every ray could be tested against every primitive in a scene and then when all of the intersection hits have been determined, the closest of the intersections could be identified. This approach is not practical to implement for scenes that may have millions or billions of primitives, where the number of rays to be processed may also be millions. Consequently, ray tracing systems typically use an acceleration structure which characterizes the geometry in the scene in a manner which can reduce the work needed for intersection testing. However, even with current state of the art acceleration structures it is difficult to perform intersection testing at a rate that is suitable for rendering images in real-time (e.g. for use with gaming applications), particularly on devices which have tight constraints on silicon area, cost and power consumption, such as on mobile devices (e.g. smart phones, tablets, laptops, etc.).

Modern ray tracing architectures typically use acceleration structures based on bounding volume hierarchies—in particular, bounding box hierarchies. Primitives are grouped together into bounding volumes that enclose them. These bounding volumes are, in turn grouped, together into larger bounding volumes that enclose them. Intersection testing then becomes easier, because, if a ray misses a bounding volume, there is no need to test it against any of the children of that bounding volume.

Intersection testing proceeds by traversing the hierarchy. If a given ray "hits" a bounding volume (node), it needs to be tested against each of the children of that bounding volume (node). This continues down through the hierarchy until the ray either misses all children of a node, or hits at least one primitive. Testing a ray against a node requires retrieving from memory (i) a description of the ray (typically defined by ray information including at least an origin and direction) and (ii) a description of the geometry of the node (either bounding volume coordinates or coordinates of the primitive). This information is indicated by a ray request, which identifies the ray and the node.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system and method for performing intersection testing of rays in a ray tracing system. The ray tracing system uses a hierarchical acceleration structure comprising a plurality of nodes, each identifying one or more elements able to be intersected by a ray. The system makes use of a serial-mode ray intersection process, in which, when a ray intersects a bounding volume, a limited number of new ray requests are generated, and intersection information, usable to identify bounding volume for which ray requests were not generated, are stored.

There is provided a computer-implemented method of performing intersection testing between one or more rays and elements identified by nodes of a hierarchical acceleration structure, wherein: a ray is defined by ray information; a node identifies one or more elements for intersection testing, wherein at least some of the elements identified by the overall hierarchical acceleration structure are represented by a further node of the hierarchical acceleration structure.

The computer-implemented method comprises iteratively performing a serial-mode ray intersection process of: obtaining one or more ray requests, each ray request identifying a ray and a node of the hierarchical structure identifying elements for which the ray of the ray request will undergo intersection testing; processing the one or more ray requests and the hierarchical acceleration structure to identify, for each ray request, any intersections between the ray of the ray request and the elements identified by the node of the ray request; and for each ray request: determining if the ray intersects with more than a first predetermined number of elements represented by further nodes of the hierarchical acceleration structure; and in response to the ray intersecting with more than the first predetermined number of element represented by further nodes, generating up to the first predetermined number of new ray requests, each new ray request identifying the ray of the ray request and a further node that represents an element identified as intersecting the ray of the ray request.

The first predetermined number may, for example, be 1. Preferably, the first predetermined number is no greater than 12, for example, no greater than 8, for example, no greater than 4. In some examples, the first predetermined number is 1, and the step of generating up to a first predetermined number of new ray requests comprises generating a single new ray request.

The step of generating up to a first predetermined number of new ray requests may comprise generating a second predetermined number of new ray requests for the ray, each new ray request identifying the ray of the ray request and a respective further node of the hierarchical structure, wherein the further node represents an element identified as intersecting the ray of the ray request. The second predetermined number is equal to or less than the first predetermined number. In one example, the second predetermined number is 1.

The computer-implemented method may further comprise, in response to the ray intersecting with more than the first predetermined number of elements represented by further nodes, generating and storing intersection information for the ray, the intersection information being usable to identify any further nodes for which no new ray request was generated and that represents an element identified as intersecting the ray of the ray request.

In some examples, the intersection information identifies: the node represented by the ray request; and information identifying for which further nodes, associated with elements identified by the node, a new ray request has been generated.

The computer-implemented method may further comprise, for each ray request, in response to the number of intersections between the ray and elements represented by further nodes being zero: determining whether the ray of the ray request is associated with any stored intersection information; and in response to determining that the ray is associated with stored intersection information: and processing the stored intersection information to generate a third predetermined number of new ray requests, each identifying the ray and a node of the hierarchical structure for which a ray request has not yet been generated for that ray and which represents an element with which the ray intersected.

The intersection information may one or more sets of one or more data blocks, each set of data blocks representing a different ray, and each data block may identify: a node that identifies more than the first predetermined number of elements, each of which is represented by a further node, with which the respective ray is determined to intersect; and information identifying for which elements, represented by further nodes, of the respective node a ray request for the respective ray has already been generated.

In some examples, the step of processing the stored intersection information comprises: identifying a most recently stored data block for the ray; processing the most recently stored data block to generate the third predetermined number of new ray requests, each identifying the ray and a node of the hierarchical structure for which a ray request has not yet been generated for that ray and which represents an element with which the ray intersected; and updating the stored intersection information.

Each set of one or more data blocks may comprise a linked list of data blocks.

Optionally, the intersection information is stored in a memory pool shared by all rays.

The computer-implemented method may further comprise, for each ray request: in response to the number of intersections between the ray and elements represented by further nodes being between one and the first predetermined number inclusively, generating a new ray request for each intersected element represented by a further node, each new ray request identifying the ray of the ray request and the respective further node that represents the intersected element.

In particular, when no intersections between the ray of the ray request and any element represented by a further node of the hierarchical structure, then no intersection information needs to be generated and/or stored. Thus, the method may comprise not generating and/or storing intersection information if the ray of the ray request fails to intersect with more than the first predetermined number of elements represented by further nodes.

The step of obtaining one or more ray requests may comprises selecting and obtaining, if available, at least one of the new ray requests generated in a previous iteration of the serial-mode ray intersection process.

The selection of new ray requests may be dependent upon the age of the new ray requests. For instance, the oldest ray requests may have a higher probability of being selected than the lowest ray requests. In one example, the oldest ray requests are selected before the youngest ray requests. The age of a new ray request refers to the length of time since the ray request was first generated. This approach may allow, for example, the oldest new ray requests to be selected first to reduce the average length of time that rays take to traverse the hierarchical structure, i.e. undergo intersection testing.

The selection of new ray requests may be dependent upon (if available) the age of stored intersection information associated with rays identified by the new ray requests. In some examples, the number of the new ray requests selected and obtained is dependent upon the total size of stored intersection information.

The number of the new ray requests selected and obtained may reduce in response the total size of stored intersection information exceeding a first predetermined threshold size.

In further examples, the number of ray requests selected and obtained further reduces in response the total size of stored intersection information exceeding a second predetermined threshold size, the second predetermined threshold size being larger than the first predetermined threshold size.

This provides a "braking" approach to the obtaining of ray requests, so that the number of ray requests obtained is reduced as the amount of free memory space decreases. This reduces a likelihood that the memory will overflow. By using a gradual braking approach, e.g. at least two predetermined thresholds, there is a reduced likelihood that the process for obtaining ray requests will bottleneck.

The selection of the at least one new ray requests, when the total size of the stored intersection information exceeds the first predetermined threshold size, may be dependent upon the age of stored intersection information associated with rays identified by the ray requests.

In some examples, the selection of the at least one new ray request, when the total size of the stored intersection information exceeds the first predetermined threshold size, comprises at least one ray request that each identify a ray associated with the oldest stored intersection information.

There is also provided an intersection testing system of performing intersection testing between one or more rays and elements identified by nodes of a hierarchical acceleration structure, wherein: a ray is defined by ray information; a node identifies one or more elements for intersection testing, wherein at least some of the elements identified by the overall hierarchical acceleration structure are represented by a further node of the hierarchical acceleration structure.

The intersection testing system comprises: a ray request processor configured to iteratively obtain one or more ray requests, each ray request identifying a ray and a node of the hierarchical structure identifying elements for which the ray of the ray request will undergo intersection testing; and an intersection test processor configured to, for each iteratively obtained ray request: process the one or more ray requests and the hierarchical acceleration structure to identify, for each ray request, any intersections between the ray of the ray request and the elements identified by the node of the ray request; and for each ray request: determine if the ray of the ray request intersects with more than a first predetermined number of elements represented by further nodes of the hierarchical acceleration structure; and in response to the ray intersecting with more than the first predetermined number of element represented by further nodes, generate up to the first predetermined number of new ray requests, each new ray request identifying the ray of the ray request and a further node that represents an element identified as intersecting the ray of the ray request.

There is also proposed a ray tracing system or a graphics processing system configured to perform any herein described method. There is also proposed a ray tracing system or a graphics processing system comprising any herein described intersection testing system. The intersection testing system, ray tracing system, or graphics processing system may be embodied in hardware on an integrated circuit.

There is also proposed a method of manufacturing, using an integrated circuit manufacturing system an intersection testing system, a ray tracing system, or graphics processing system as herein described.

Also provided is a method of manufacturing, using an integrated circuit manufacturing system, an intersection testing system, ray tracing system, or graphics processing system as summarized above, the method comprising: processing, using a layout processing system, a computer readable description of the intersection testing system, ray tracing system, or graphics processing system so as to generate a circuit layout description of an integrated circuit embodying the intersection testing system, ray tracing system, or graphics processing system; and manufacturing, using an integrated circuit generation system, the intersection testing system, ray tracing system, or graphics processing system according to the circuit layout description.

There is also provided computer readable code configured to cause any herein described method to be performed when the code is run. There is also provided a computer readable storage medium having encoded thereon the computer readable code described herein. The storage medium may be a non-transitory computer readable storage medium. When executed at a computer system, the computer readable code may cause the computer system to perform any of the methods described herein.

There is also provide an integrated circuit definition dataset that, when processed in an integrated circuit manufacturing system, configures the integrated circuit manufacturing system to manufacture an intersection testing system, a ray tracing system, or a graphics processing system as herein described.

Also provided is a non-transitory computer readable storage medium having stored thereon a computer readable description of an intersection testing system, ray tracing system, or graphics processing system as summarized above that, when processed in an integrated circuit manufacturing system, causes the integrated circuit manufacturing system to manufacture an integrated circuit embodying the intersection testing system, ray tracing system, or graphics processing system.

Also provided is a non-transitory computer readable storage medium having stored thereon a computer readable description of an intersection testing system, ray tracing system, or graphics processing system as summarized above which, when processed in an integrated circuit manufacturing system, causes the integrated circuit manufacturing system to: process, using a layout processing system, the computer readable description of the intersection testing system, ray tracing system, or graphics processing system so as to generate a circuit layout description of an integrated circuit embodying the intersection testing system, ray tracing system, or graphics processing system; and manufacture, using an integrated circuit generation system, the intersection testing system, ray tracing system, or graphics processing system according to the circuit layout description.

There is also provided an integrated circuit manufacturing system configured to manufacture any herein described intersection testing system, ray tracing system or graphics processing system.

The integrated circuit manufacturing system may comprise: non-transitory computer readable storage medium having stored thereon a computer readable description of an intersection testing system, ray tracing system, or graphics processing system as summarized above; a layout processing system configured to process the computer readable description so as to generate a circuit layout description of an integrated circuit embodying the intersection testing system, ray tracing system, or graphics processing system; and an integrated circuit generation system configured to manufacture the intersection testing system, ray tracing system, or graphics processing system according to the circuit layout description, The layout processing system may be configured to determine positional information for logical components of a circuit derived from the integrated circuit description so as to generate a circuit layout description of an integrated circuit embodying the intersection testing system, ray tracing system, or graphics processing system.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
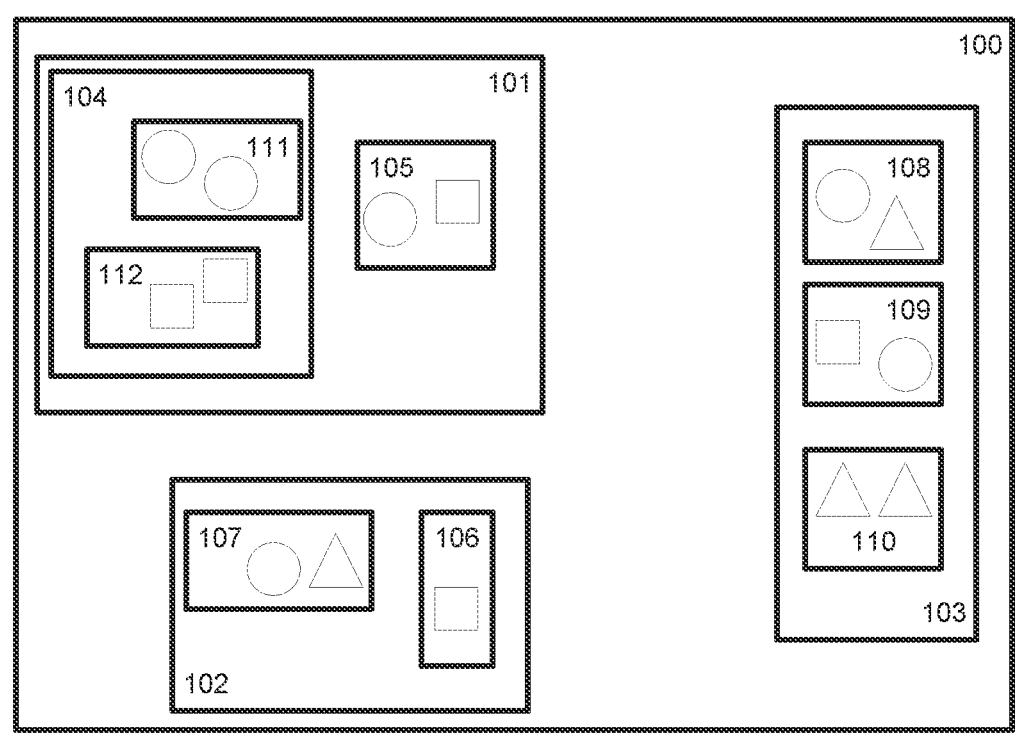
FIG. 1 shows a scene divided according to a bounding volume structure.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Before explaining examples of the disclosed system in detail, it will be useful to explain examples of the acceleration structures that are used.

FIG. 1 illustrates a scene 100, which includes a number of different objects or primitives (illustrated as circles, squares and triangles). The scene is conceptually divisible into bounding volumes 101-112, namely axis-aligned bounding boxes (AABBs). Each bounding volume thereby represents a portion of the scene. Conceptually, each bounding volume bounds or contains one or more elements, where an element can be a bounding volume, a primitive or another suitable elemental structure for use in ray tracing architectures (such as an instance which, if intersected by a ray, triggers use of another hierarchical structure). For example, a first group of bounding volumes 101-104 may each bound one or more other bounding volumes. A second group of bounding volumes 105-112 may each bound one or more primitives in the scene. As an example, a bounding volume 105 may bound a first set of primitives.

In the illustrated example, a first bounding volume 101 bounds two further bounding volumes 104, 105; a second bounding volume 102 bounds two further bounding volumes 106, 107 and a third bounding volume bounds three further bounding volumes 108, 109, 110. One of the further bounding volumes 104 of the first bounding volume, a "first further bounding volume", in turn bounds two additional bounding volumes 111, 112.

It will be clear that if a ray fails to intersect with a bounding volume, then it can be inferred that the ray will not intersect with any elements bound by or contained in that bounding volume. The use of bounding volumes therefore provides a mechanism for reducing the number of intersection tests that need to be performed.

Figure 2:
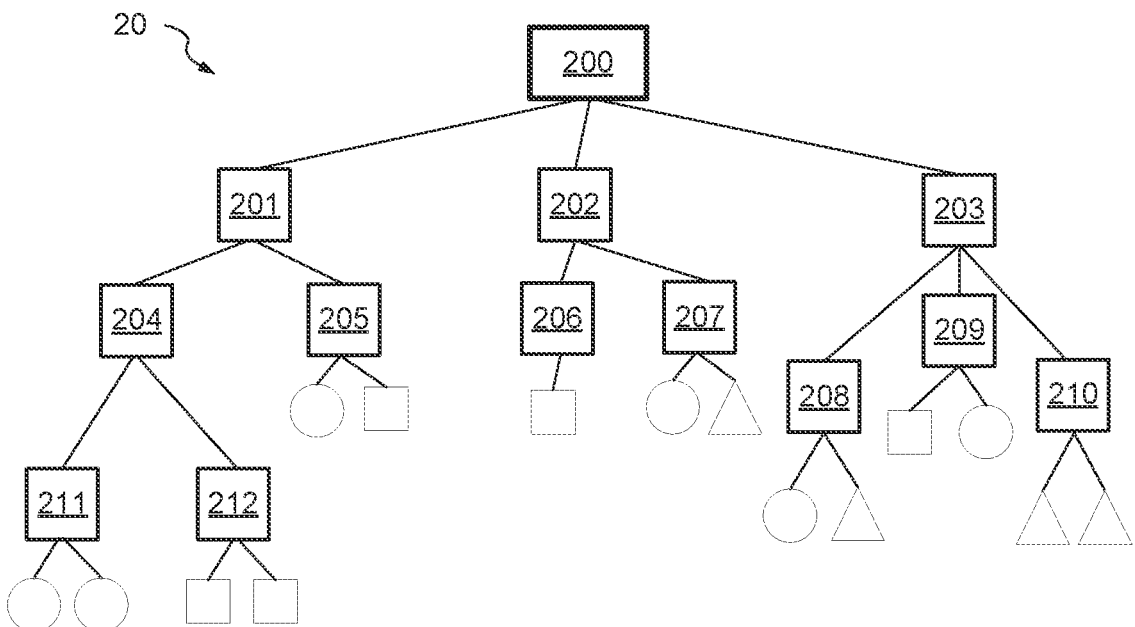
FIG. 2 represents a hierarchical acceleration structure for the bounding volume structure shown in FIG. 1.

The scene 100 can be represented by a hierarchical acceleration structure 20, as illustrated in FIG. 2. The hierarchical acceleration structure 20 is formed of a plurality of nodes 201-212 branching from a root node 200 (representing the scene 100). Each node 201-212 represents a respective bounding volume 101-112. In particular, each node may comprise a list (sometimes labelled a "test list")

or other collection that identifies any elements contained by the bounding volume represented by the node. In this way, each node identifies one or more elements that could be intersected by a ray (e.g. further bounding volumes or primitives). In the illustrated hierarchical acceleration structure 20, this identification is illustrated as branches from a node.

Methods for determining the bounding volumes for building nodes of a hierarchy are known in the art, and may be performed in a top-down manner (e.g. starting at the root node and working down the hierarchy), or may be performed in a bottom-up manner (e.g. starting at the leaf nodes and working up the hierarchy).

Performing an intersection test on a ray can be performed by working the ray through the hierarchical acceleration structure, starting at the root node. Any intersections between elements identified by a node (e.g. elements branching from a node) and the ray are identified. If the ray is determined to intersect another bounding volume (which is itself represented by a (further) node of the hierarchical acceleration structure), then the ray is tested against the elements of the node represented by that bounding volume, thereby working its way through the hierarchical structure.

Methods of determining an intersection between a ray and an element are well known, and typically comprise processing geometries of the element and the data of the ray to identify whether or not the ray intersects the element.

The leaf nodes of the hierarchical acceleration structure identify at least one primitive or a single instance (an example of a particular type of bounding box, which will be briefly explained below). Some hierarchical structures may only comprise leaf nodes that identify an instance. Other hierarchical structures may only comprise leaf nodes that identify primitives.

The primitives in this example (a circle, triangle, and square) are simple geometric shapes; therefore, they can each be described using a single primitive. Objects that are more complex may be described by multiple primitives. As will be well known to those skilled in the art, triangular primitives are common in graphics applications. However, the scope of the present disclosure is not limited to triangular primitives. In particular, in ray tracing, primitives may be 'procedural' in the sense that they may be programmatically defined.

The examples illustrated in FIGS. 1 and 2 depict a simple scenario in which all objects of a scene are represented by primitives that are directly identified in the hierarchical acceleration structure.

However, in some examples, objects can be represented by an "instance", which is a particular type of bounding volume and provides another example of an element that may be identified by a leaf node of the hierarchical acceleration structure 20.

Effectively, the instance locates and orients a predefined object in the scene. An instance is associated with a Bottom Level Acceleration Structure (BLAS) that describes the predefined object within a "local space" for the object, e.g. identifies a relative location of primitives that form the object with respect to some predefined co-ordinate space (which likely differs from the "world space" of the scene, depending upon the orientation of the given instance of the object within the scene). The BLAS may itself be formed of nodes that identify bounding volumes that bound/enclose the primitives of the predefined object, in a similar manner to the previously described structure 20. An instance of the object in a scene can thus be specified by a so-called instance transformation matrix, which maps the object (and its associated bounding volume hierarchy) as defined in the object's "local space" to the required position/orientation in the "world space". The instance transformation matrix may also perform other operations on the underlying object, such as stretches or reflections. Instancing thus allows a single BLAS to be used multiple times when creating an acceleration structure for a wider scene, to represent multiple versions or 'instances' of the same object in a scene at different locations and orientations.

If an intersection between a ray and an instance is detected, this can trigger the traversal of the ray through the BLAS associated with the instance, to thereby determine any intersections between the ray and the primitives of the predefined object.

In this way, an instance is treated as a type of bounding volume that, when intersected by a ray, triggers further intersection testing of that ray with one or more nodes of a different hierarchical acceleration structure, rather than with further nodes of the original hierarchical acceleration structure.

Intersection with an instance thereby triggers traversal of a ray through a secondary hierarchical acceleration structure, namely a Bottom Level Acceleration Structure (BLAS). Where one or more BLAS's are available, the hierarchical acceleration structure that has nodes that identify instances for triggering the traversal of BLAS's (e.g. the structure 20) is commonly known as a Top Level Acceleration Structure (TLAS). The TLAS thereby describes the scene at a high level, starting from a root node at the top level, and terminating in leaf nodes that identify instances (identifying BLAS's) and/or primitives at the lowest level. One example of a TLAS terminates in only instances at the lowest level (i.e. does not itself comprise any primitives). The precise nature of the TLAS will depend upon implementation details.

The necessary operations for traversing a BLAS are well known in the art, e.g. transforming either the parameters of a "world space" ray or the geometry of a "local space" node using the instance transformation matrix, to bring the ray and the geometry (of the "local space" node) into the same coordinate system to perform intersection testing, and are not described in detail for the sake of conciseness.

Figure 3:
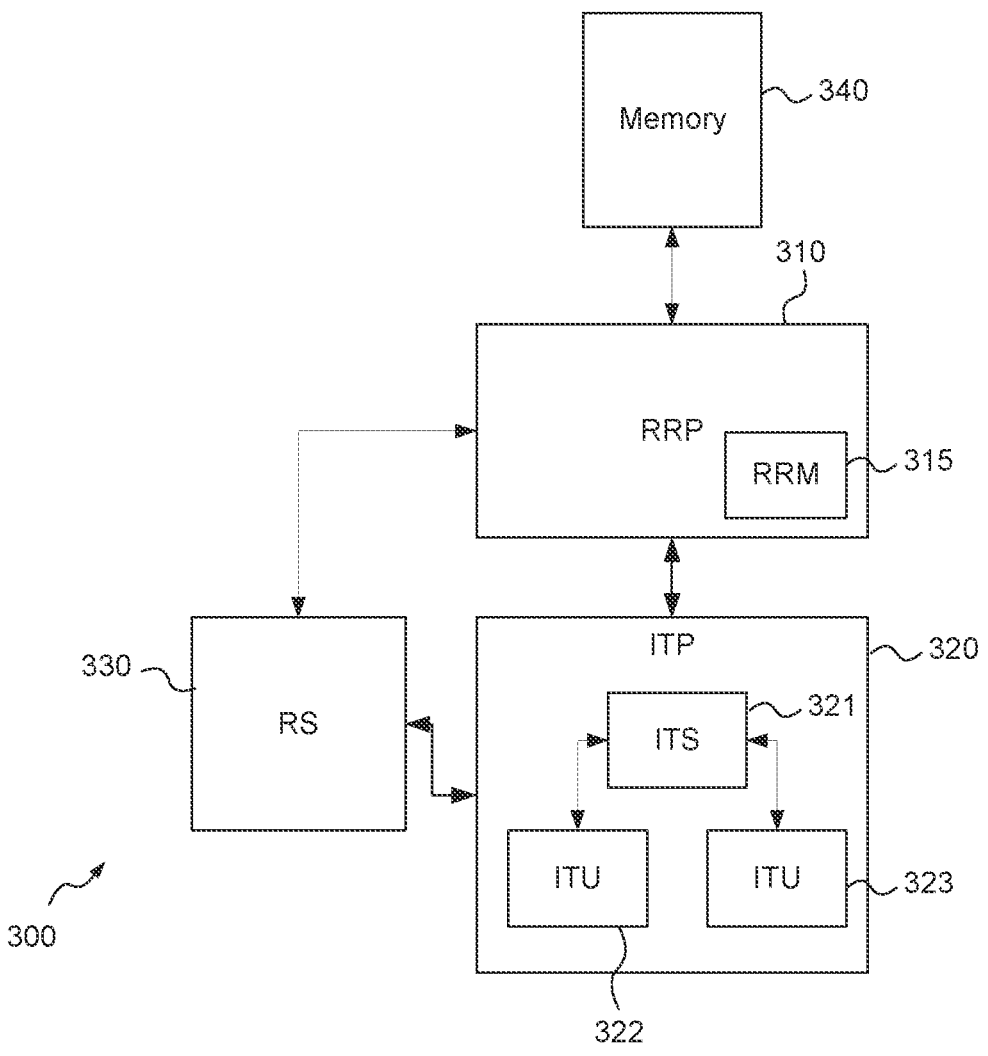
FIG. 3 is a simplified block diagram of a system for intersection testing of rays, according to an example.

FIG. 3 illustrates a block diagram of an intersection testing system 300 for performing intersection testing with rays of a ray tracing system, according to an example. It will be understood that this block diagram is part of an overall ray tracing system, the other components of which are outside the scope of this disclosure.

The system 300 comprises a ray request processor (RRP) 310; an intersection test processor (ITP) 320; and a ray store (RS) 330.

The ray store 330 stores information on all rays that desire intersection testing for a particular scene. The stored information may contain at least a unique identifier of the ray and geometric information of the ray (e.g. a source and direction of a ray with respect to the scene, as well as perhaps ray extents specifying the bounds of a section of the ray to be tested for intersection). The unique identifier of the ray may, for example, simply be a memory address of the ray store 330.

The intersection test processor (ITP) 320 may comprise an intersection test scheduler (ITS) 321 that co-ordinates intersection testing between rays and elements of the scene (e.g. bounding volumes, including instances, or primitives). The intersection test processor receives information that identifies rays to be tested and, for each ray, information identifying which element(s) that ray is to be tested against (e.g. information identifying a list of elements against which the ray is to be tested). The intersection test scheduler may communicate with one or more intersection testing units (ITU) 322, 323 to perform the intersection testing. In particular, the testing units may perform the actual intersection testing, by comparing geometries of an element with the geometric information of the ray, following known operations. The intersection test scheduler 321 can schedule the performance of testing units 322, 323.

The ray request processor 310 submits information on intersection tests to be performed to the intersection test processor 320. In particular, the ray request processor 310 may obtain and/or generate ray requests using information on rays stored in the ray store 330, and submit information to the intersection test processor 320 that enables the intersection test processor to co-ordinate intersection testing. A ray request may identify a ray and a node that identifies elements against which the ray is to be tested.

In some examples, the ray request processor 310 is configured to provide the intersection test processor 320 with geometric information about the elements of the scene that are involved in intersection testing for the processed ray requests. This process may comprise requesting data from a memory 340 containing the geometries of each element that is to be involved in an intersection test.

The ray request processor 310 may comprise or communicate with a ray request memory/buffer (RRM) 315. The ray request memory stores ray requests that are to be processed.

In particular examples, the ray request processor 310 obtains ray requests (each identifying a ray and a node of a hierarchical acceleration structure that identifies element(s) against which the ray is to be tested), and bundles rays into ray stacks. A ray stack identifies rays that are to be tested against elements of the same node. A ray stack is thereby effectively a collated set of ray requests, i.e. can be effectively treated as a ray request that identifies more than one ray (rather than a single ray). These ray stacks may then be passed to the intersection test processor 320 for processing. Thus, the ray request processor 310 may be a coherency gatherer.

Each ray stack may be accompanied with geometric information about the elements of the node (which identifies the elements against which the ray stack is to be tested), which geometric information may be obtained by the RRP 310 from the memory 340. This facilitates intersection testing between these elements and the rays of the ray stack.

The information on rays stored in the ray store 330 may be updated based on the processing performed by the ray request processor and/or the intersection test processor. For example, the information may comprise data that indicates whether or not an intersection testing process with a ray has been completed or not (such as a counter).

The intersection testing system 300 may be capable of processing rays in two different modes, a parallel mode or a serial mode, described in this disclosure. In the context of this passage, a "mode" is a processing path or process performed on a ray dependent upon the type of the ray. Thus, the intersection testing system 300 may simultaneously operate in the parallel mode and the serial mode, processing some rays in the parallel mode, and other rays in the serial mode. The advantage of processing in the serial mode will be become apparent from the following disclosure.

Rays undergoing processing in the parallel mode can be labelled "parallel-mode rays" and rays undergoing processing in the serial mode can be labelled "serial-mode rays". Thus, two types of rays are defined: a parallel-mode ray which is processed in the parallel mode and a serial-mode ray which is processed in the serial mode. A ray request for a serial-mode ray can be labelled a "serial-mode ray request" and ray requests for a parallel-mode ray can be labelled a "parallel-mode ray request". Each ray may be associated with a mode indicator, e.g. stored as part of the information on rays stored in the ray store 330, which indicates in which of these two modes a ray is to be processed. Other approaches for identifying a current mode of a ray will be apparent, e.g. through appropriate labelling of a ray's identity or association of a ray's identity with a mode via a separate look-up table.

Figure 4:
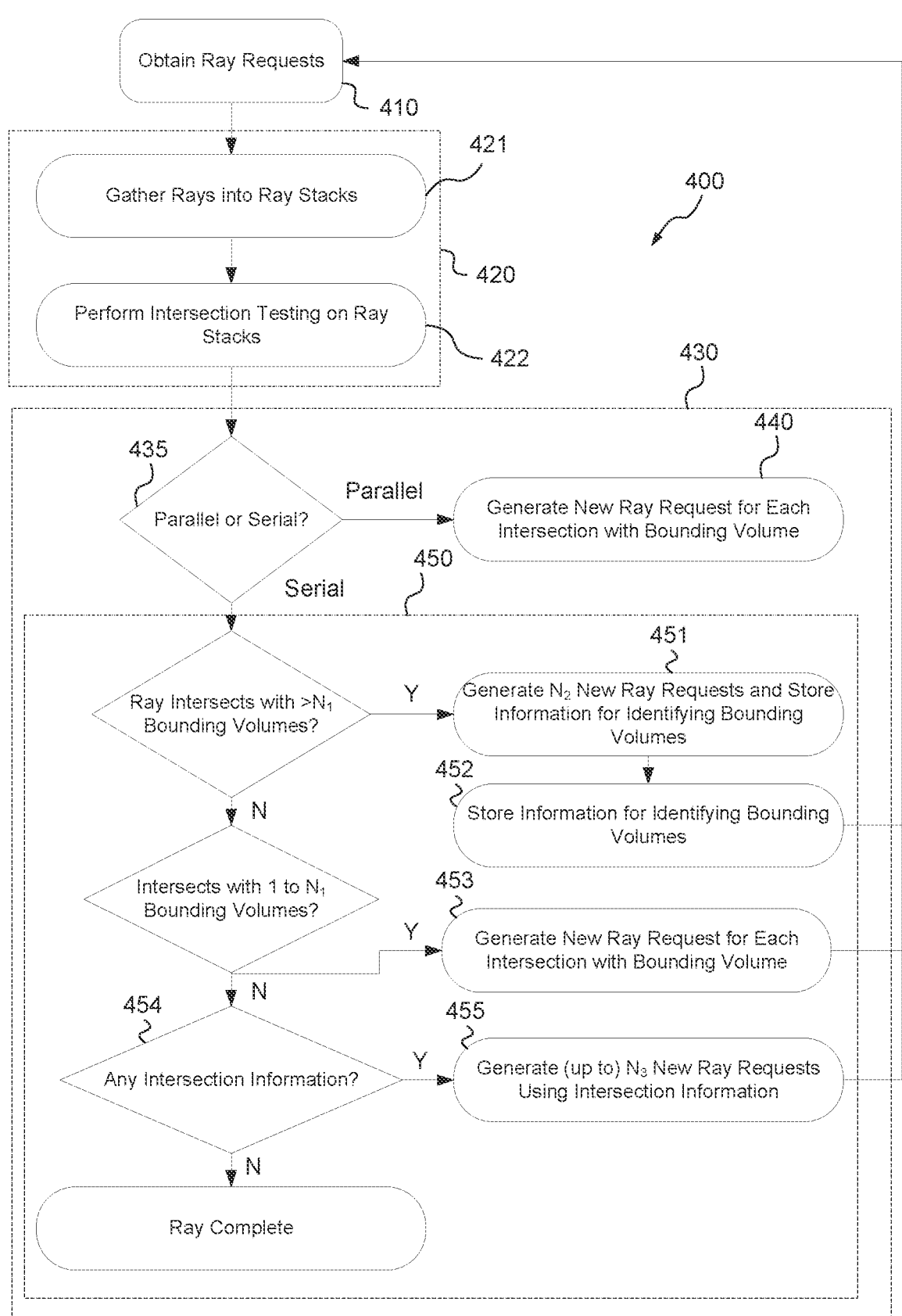
FIG. 4 is a flowchart illustrating a method.

FIG. 4 is a flow chart that illustrates a process 400, which is iteratively performed, for performing intersection testing with rays using a hierarchical acceleration structure. All rays, i.e. both serial-mode and parallel-mode, may undergo this process. The process 400 may be performed by the intersection testing system 300, described in FIG. 3.

Process 400 may be performed after the rays and the hierarchical acceleration structure (against which the rays are to be tested) have been obtained. In other words, the process 400 may be performed only when the rays and hierarchical structure have been defined. Thus, process 400 provides an intersection testing process between existing and defined rays and nodes represented in a hierarchical structure.

The process 400 comprises a step 410 of obtaining ray requests. This step is performed by the ray request processor 310.

Each ray subject to the process 400 is associated with a ray request. The ray request contains ray information, which here identifies the ray (e.g. an origin and direction of the ray, and perhaps also ray extents indicating a portion of the ray that is to be tested) and a node (of the hierarchical acceleration structure) that identifies elements against which the ray of the ray request is to be intersection tested.

When a ray is first submitted to the process 400 (i.e. is not associated with a previous ray request), the node identified by the ray is the root node of the hierarchical acceleration structure. The generation of the first ray request for the node may be performed by the ray request processor (e.g. by receiving and processing a new ray from the ray store 330).

The ray exits or completes the process 400 when no new ray requests are generated or available for the ray.

The process 400 comprises a sub-process 420 of processing the ray requests to identify elements (identified by the node of the ray request) with which the ray of each ray request interacts. In other words, sub-process 420 comprises determining intersections between rays (of ray requests) and corresponding elements (identified by nodes of each ray request).

The sub-process 420 may comprise a coherence gathering step 421, comprising gathering or bundling multiple rays into sets of rays ("ray stacks"). Each ray stack identifies rays that are to be tested against the elements of a same node. This is performed by processing the obtained ray requests to identify groups of ray requests having/identifying the same node, to thereby determine which rays form part of a same ray stack.

As previously explained, a ray stack is effectively a collated set of ray requests, i.e. can be effectively treated as a ray request that identifies more than one ray (rather than a single ray).

If executed, step 421 is performed by the ray request processor 310.

The sub-process 420 may further comprise a testing step 422, in which each ray stack (or ray request, if step 421 is not performed) is tested against the (elements identified by the) node associated with the ray stack. In particular, each ray of a ray stack (or the ray requests) is tested against each element of the node of the ray stack to identify any intersections between any of the rays and any of the elements. In this way, for each ray of the ray stack and each element identified by the node, it is determined whether or not that ray intersects with that element. This effectively identifies any intersections between each ray of the ray stack and any elements contained within the bounding volume represented by the node of the ray stack.

Approaches for performing intersection testing between an element (such as a bounding volume or a primitive) and a ray are well known in the art, and typically comprise processing geometries of the element and the ray in order to determine whether or not the ray intersects with the element.

Step 422 is performed using the intersection test processor 320. The intersection test processor may, for example, use the ITS 321 to co-ordinate intersection testing using the testing units 322-323.

As previously explained, in some examples, each node is or comprises a list, which identifies the elements that conceptually branch off the node (conceptually, the elements that are bound by or contained in the bounding volume represented by the node). Each ray of a ray stack (associated with a particular node) is tested against (the geometries of) each element of the list of that particular node to identify any intersections between a ray and the element.

In this way, sub-process 420 can identify intersections between rays identified by the obtained ray requests and the elements of the corresponding nodes identified by the obtained ray requests.

Use of the described coherence gathering step 421 means that a list and (geometric) information on elements of the list only need to be retrieved from memory once each time step 421 is performed, e.g. rather than being retrieved for each separate ray request.

The step 410 and sub-process 420 is common to both serial-mode and parallel-mode rays. Thus, ray requests for both serial-mode and parallel-mode rays can be processed in the manner previously described.

The process 400 further comprises a sub-process 430, which performs one or more actions an action based on any identified intersections. The actions performed in the sub-process 430 depend upon whether or not a ray (request) is a serial-mode ray (request) or a parallel-mode ray (request).

Sub-process 430 may therefore comprise determining if a ray is a serial-mode ray or a parallel-mode ray. This may be performed, for example, by checking an identity of the ray (e.g. consulting the ray store) in a determination step 435.

For a parallel mode ray request, a parallel-mode ray request generation step takes place in a process 440. For a serial-mode ray request, a serial-mode ray request generation step takes place in a process 450.

Process 440 comprises generating a new ray request for each intersection between the ray of the ray request and a bounding volume identified by the node of the ray request, each new ray request identifying the (same) ray of the ray request and the further node that represents the bounding volume. The ray identified in each new ray request is the same ray (i.e. a ray having the same properties) as the (original) ray request that caused the generation of the new ray request(s). Thus, in the process 440, each identified intersection between the ray of that request and a bounding volume (contained within the bounding volume represented by the node identified by the ray request) triggers the generation of a new (parallel-mode) ray request. The new ray request identifies the parallel mode ray, and the node represented by the bounding volume with which the parallel mode ray intersected. Thus, if multiple bounding volume intersections are detected for a given parallel-mode ray in sub-process 420, multiple new ray requests can be generated in process 440.

In this way, the number of new ray requested generated, each time process 440 is performed for a parallel-mode ray, is unrestricted.

The generation of a new ray request can be performed by the ray request processor 310 (e.g. based on information about identified intersections received from the intersection test processor 320) or the intersection test processor 320 itself. Thus, step 440 can be performed by the ray request processor or (less preferably) the intersection test processor 320.

The newly generated parallel-mode ray requests may be stored in the ray request memory 315. Each newly generated parallel-mode ray request is obtained in step 410 and processed in step 420 in a subsequent iteration of process 400.

For the parallel mode ray, if there are no identified intersections between the ray and any further bounding volumes identified by the node of any ray request for that ray, then the ray has successfully traversed the hierarchical acceleration structure (i.e. the ray has either missed all of the objects in the scene, or it is has intersected with a primitive).

This can be checked by storing, for each parallel-mode ray, a counter. This counter can be stored in the ray store 330 (which stores information on each ray). The counter is initialized (when the ray is first submitted to the process) at 1. Each time a new ray request is generated (i.e. an intersection is identified), the counter for that ray can be increased by 1 for each bounding volume intersected (by a communication from the intersection test processor to the ray store 330). The counter for a particular ray is reduced by 1 each time a ray request is fully processed (e.g. when the ray of the ray request had undergone an intersection iteration test). The counter thereby effectively tracks how many ray requests are associated with a particular ray. The ray is "complete" when the counter reaches 0, after which the ray may be deleted from the ray store.

From the foregoing, it will be apparent that a single parallel-mode ray can be associated with a potentially unlimited number of different ray requests. This is because each time it is determined that a ray interacts with a bounding volume, then a new ray request is generated.

The present disclosure recognizes that, in some circumstances, a parallel-mode ray can result in an extremely large number of new ray requests being generated (e.g. if a ray intersects with more than a threshold number of elements of a scene). This can, for example, fill a ray request memory or otherwise cause an overflow (e.g. in the ray request processor).

The present disclosure proposes a new processing mode, labelled the "serial mode" which overcomes these issues, by effectively restricting the number of new ray requests (for a given serial-mode ray request) that can be generated during each iteration of process 400. In some examples, rays may be initially processed in the parallel-mode and, if an overflow condition occurs, be dropped (e.g. from the process 400) or flagged and re-processed in the serial mode.

The following passages describe an operation performed on serial-mode ray requests according to an embodiment.

The serial-mode ray request generation process 450, performed only on serial-mode rays, comprises if at least one intersection between the ray of the ray request and a bounding volume is identified: generating up to a first predetermined number of new ray requests. Thus, the number of new ray requests for a serial-mode ray is restricted to being no greater than the first predetermined number. Each new ray request again identifies the (same) ray of the ray request (that triggered or caused the generation of the new ray requests) and a further node that represents an element identified as intersecting the ray of the ray request. In this way, each new ray request differs from the original ray request, i.e. the ray request that triggered or caused the generation of the new ray request, in that a different node is identified, with the ray identified by the new ray request being unchanged from the original ray request.

Preferably, this process 450 also comprises steps for (if necessary) generating and storing intersection information. The intersection information is information usable to identify further nodes for which no new ray request was generated and that represent elements for which it was identified that the ray of the ray request intersected. The intersection information only needs to be generated and stored if the serial-mode ray (of a particular serial-mode ray request) is determined to intersect with more than the first predetermined number of bounding volumes.

A particular example for the process 450 shall be hereafter described.

For a serial-mode ray (request): if more than a first predetermined number $N_1$ (e.g. 1) of intersections with bounding volumes (identified by the node of the ray request) is identified in step 422, then the sub-process 450 performs a step 451 of generating a second predetermined number $N_2$ (e.g. 1) of new ray requests for the ray and a step 452 of generating and storing intersection information. The second predetermined number is less than or equal to the first predetermined number, so that no more than the first predetermined number of new ray requests are generated for a serial-mode ray.

Each of the second predetermined number $N_2$ of new ray requests identifies the serial-mode ray and a further node (e.g. list) of the hierarchical structure. The further node represents a bounding volume (i.e. geometric information) with which it was determined the ray intersected. Each new ray request represents a different bounding volume.

The intersection information identifies the node associated with the (original) ray request, i.e. the node associated with the original ray request that identified a node which in turn identified more than the first predetermined number of bounding volumes with which the ray intersects. The intersection information also identifies information suitable for identifying for which further nodes (branching from the node of the original ray request) a new ray request has already been generated.

Thus, in some instances, not every identified intersection involving a serial-mode ray results in a new ray request being generated. Rather, only a maximum number of new ray requests are generated, with data usable for identifying for which bounding volumes (represented by a node) ray requests have not yet been generated being stored for future use.

This effectively restricts the number of new ray requests that can be generated based on a single ray request for a serial-mode ray. This can avoid or reduce the likelihood of memory or processor overflow in the ray request processor.

For a serial-mode ray (request): if more than 0 and no more than the first predetermined number $N_1$ (i.e. between 1 and $N_1$ inclusive) of intersections with bounding volumes (represented by the node associated with the ray request) are identified, then the process 450 performs a step 453 of generating a new ray request for each identified intersection.

Each new ray request identifies the ray of the serial-mode ray request and the node that represents a bounding volume with which the ray (of the serial-mode ray request) intersects. Thus, the serial-mode ray (request) can be treated in a similar manner to the parallel-mode ray request.

For a serial-mode ray (request): if no intersections are identified, then the process 450 performs a step 454 of determining or checking whether the ray is associated with any stored intersection information. If the ray is associated with stored intersection information, then it is processed in a step 455 to generate up to a third predetermined number $N_3$ (e.g. 1) of new ray requests. The third predetermined number $N_3$ may be equal to the first predetermined number.

Step 455 may further comprise updating the stored intersection information based on the generated new ray requests.

In some examples, step 453 further comprises (if less than the first predetermined number $N_1$ of intersections with bounding volumes are identified) determining or checking whether the ray is associated with any stored intersection information. If the ray is associated with stored intersection information, then it is processed in to generate additional new ray requests (e.g. so that the total number of ray requests generated by step 453 is up to a fourth predetermined number $N_4$, which may be identical to the first and/or third predetermined number).

In some examples, each ray is associated with a maximum number of active ray requests, e.g. up to a fifth predetermined number of active ray requests $N_5$. In these examples, the intersection results of all ray requests for a particular ray are processed so that no more than a fifth predetermined number $N_5$ of ray requests are generated for a next iteration of the process 400. This process may comprise, for example, modifying the values of one or more of the first through fourth predetermined values.

Thus, the process 450, for a serial-mode ray (request), rather than generating a ray request for each identified intersection with a bounding volume (an element represented by a further node of the hierarchical structure), generates up to a maximum number of new ray requests for each iteration of the process. Information on all other intersections is stored until the ray does not intersect with any tested bounding volume (or optionally, intersects with less than a predetermined number of intersections). In this situation, the stored information is used to generate a next set of one or more ray requests.

The ray is able to exit the recursive process when no intersections for any ray request of the ray are identified and when the stored intersection information does not identify or no longer identifies any information identifying any untested elements. Thus, the counter is no longer required for use with serial-mode rays.

At least one of the newly generated serial-mode ray requests may be obtained in a step 410 (and processed in step 420) of a subsequent iteration of process 400. The precise number of serial-mode ray requests obtained and processed may depend, for example, upon available storage space for stored intersection information or the like. In other examples, all newly generated serial-mode ray requests are obtained in the step 410.

As previously explained, the proposed approach for handling serial-mode rays prevents or reduces the likelihood that a memory buffer for the ray request processor will overflow.

The intersection information for a particular ray may be stored in a LIFO or similar data storage module. In particular, this data storage module may be designed so that information for the most recently identified intersections of a ray is processed before less recently identified intersections.

The intersection information, for each ray, may comprise at least one data block, each data block comprising: information on a node that identifies more than the first predetermined number of elements with which the ray originally interacted; and information on for which of these elements ray requests have already been generated. Thus, the intersection information may be formed of one or more sets of each data blocks, each set representing a different ray.

If more than one data block is stored for a given serial-mode ray, then preferably the most recently stored data block is used to generate the next ray request(s) (when the intersection information is processed to generate the next ray request(s)).

For ease of processing, each data block may be linked to one another, e.g. each data block may point to another data block for the same ray. This can be performed using a linked-list (set out below).

The intersection information may be stored in a common memory, i.e. memory which is not pre-allocated on a ray by ray basis, so that intersection information for all rays can be stored in a same memory. The common memory is preferably an on-chip memory.

Figure 5:
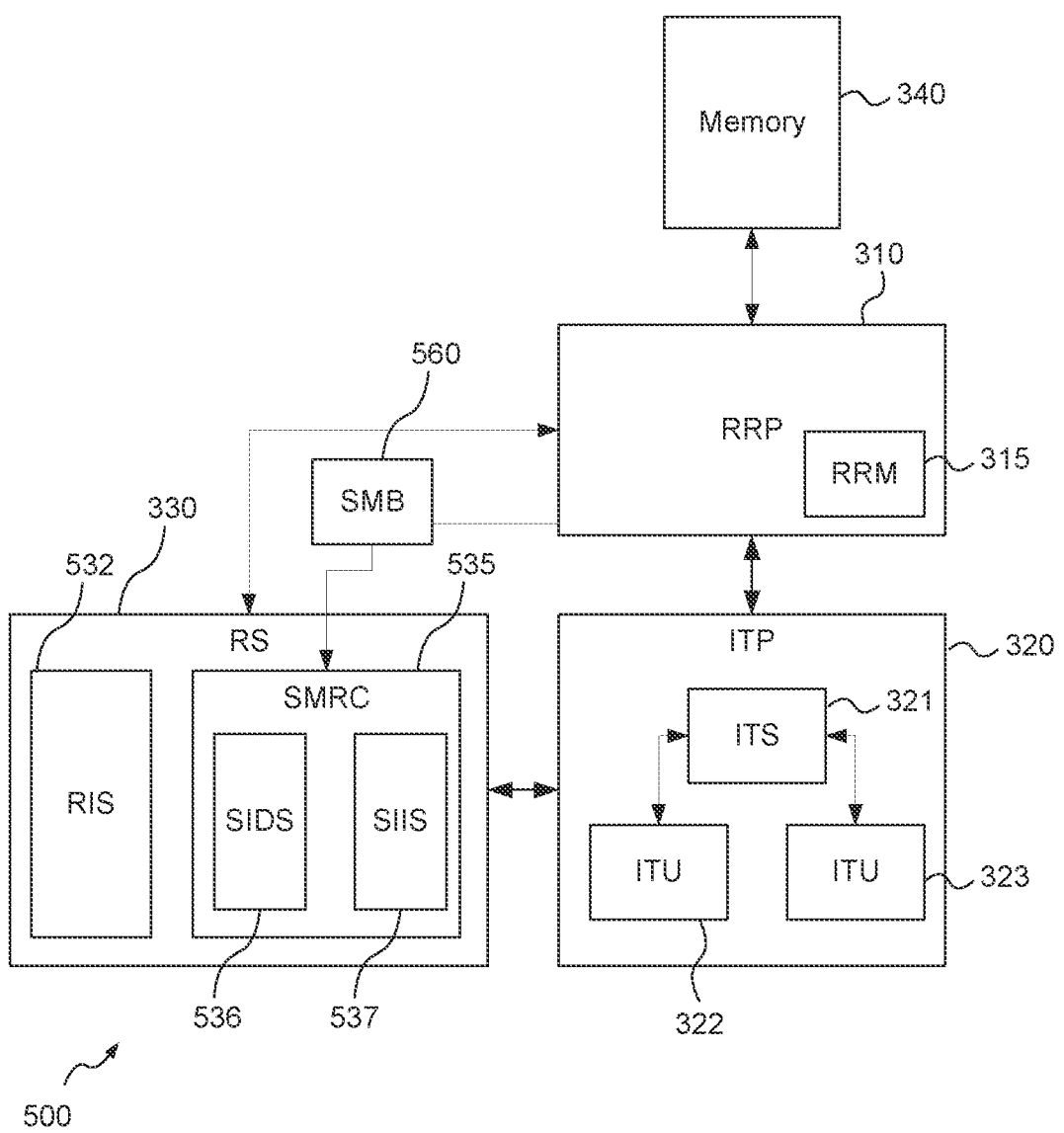
FIG. 5 is a more detailed block diagram of a system for intersection testing of rays, according to an example.

FIG. 5 illustrates a more detailed intersection testing system 500 according to an embodiment of the invention. The intersection testing system 500 is configured for performing both serial mode and parallel-mode processing of rays.

As previously, the intersection testing system comprises a ray request processor 310; an intersection test processor 320; and a ray store 330. The ray request processor 310 here is a coherency gatherer.

The ray store 330 may comprise a ray information store (RIS) 532. The ray information store 532 may store information on all rays (both parallel-mode and serial-mode) rays that are being processed. The stored information may comprise, for each ray, a ray ID (providing a unique identifier for the ray), a mode indicator (indicating which mode the ray is operating in) and a counter (the operation of which, for a parallel-mode ray, has been previously described).

The intersection testing system 500 may further comprise a serial-mode ray controller (SMRC) 535. This may be formed as a separate processing module or, in some examples, incorporated into the ray store 330 (e.g. as added functionality of the ray store).

The serial-mode ray controller 535 is configured to store information about serial-mode ray requests that are to be processed by the ray request processor. In particular, the serial-mode ray controller may receive information about intersections between a serial-mode ray and elements (of the scene), and determine how further ray requests for the serial-mode ray are to be generated.

The serial-mode ray controller 535 may be configured to handle which serial mode ray requests are obtained by the ray request processor 310 (i.e. in step 410 of the process 400 described in FIG. 4).

The serial-mode ray controller 535 may comprise two storage modules (both of which are preferably on chip storage modules). The serial-mode ray controller 535 may comprise a serial ID (SID) store (SIDS) 536 (which can be otherwise labelled a "serial-mode ray store") and a shared intersection information store (SIIS) 537.

Figure 6:
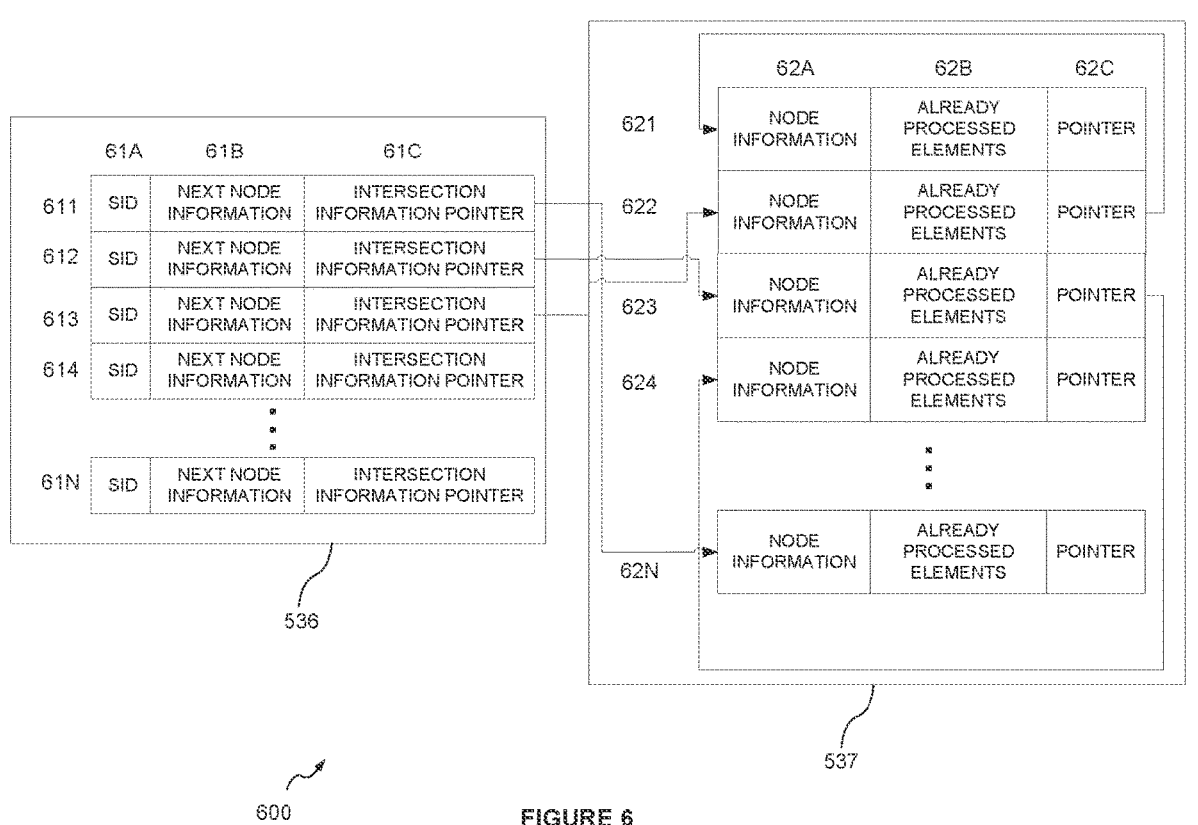
FIG. 6 illustrates a data structure for storing data stored by storage modules of a serial-mode ray controller.

FIG. 6 illustrates one example of a data structure 600 for storing data stored by the storage modules of the serial-mode ray controller 535, for improved contextual understanding.

The SID store 536 may comprise a fixed number of entries 611-61N, each entry being associated with a different serial-mode ray. Each entry in the SID store ("SID entry") may comprise a unique serial identifier (serial ID or SID), 61A. In some examples, this is simply a unique memory address of the SID entry.

The ray information store 532 may be adapted to store data indicating, for a ray operating in the serial mode, the serial ID associated with the ray (i.e. identifying which entry in the SID store is associated with the ray). This data may be stored in the same memory space previously allocated for use as a counter (if the ray were operating in the parallel mode). This recognizes that the counter is unused in the serial mode approach, and proposes to repurpose the memory space for reduced data storage wastage.

Each entry in the SID store 536 may also further contain information 61B on the next node (or optionally nodes) that identifies elements against which the serial-mode ray is to be intersection tested, i.e. information usable for generating the next ray request(s) for that ray. This is illustrated in FIG. 6 as "Next Node Information".

The shared intersection information store 537 stores intersection information for all the serial-mode rays stored in the serial ID store. The memory space of the shared intersection information is preferably not pre-allocated per serial ray, i.e. there is not a dedicated amount of space for each entry in the SID store. In other words, the shared intersection information store is a shared pool of memory resource for intersection information. In some examples, different blocks of data forming intersection information of a same serial-mode ray may point to one another, e.g. using a linked-list, to associate different (unallocated) parts of memory to a same serial-mode ray.

The intersection information for a ray may be stored, in the shared intersection information store 537, as one or more "SIIS entries" or "data blocks" 621-62N (e.g. each being a different entry or memory address in the shared intersection information store). Each data block 621-62N comprises information 62A on a node that identified more than the first predetermined number of bounding volumes with which the ray originally intersected, i.e. a node having more than the first predetermined number of bounding volumes that are intersected by the serial-mode ray. Each data block also comprises information 62B on for which of these bounding volumes corresponding ray requests have already been generated (i.e. which intersected bounding volumes have already been processed). This may be in the form of an "offset" value, indicating which elements associated with the node have already been processed, e.g. indicating how far down a list of elements (associated with that node) ray request(s) have already been generated.

Each data block may also point, via a pointer 62C, to a further data block associated with the serial ray. This may effectively form a linked-list for the serial ray.

Each entry in the SID store 536 ("SID entry") may further comprise (if relevant, e.g. if intersection information for a serial-mode ray is stored in the shared intersection information store 537) a pointer 61C to an entry in the shared intersection information store. In particular, the pointer may points to a most recently data block for the serial-mode ray.

The serial ID store 536 may store up to a maximum predetermined number of serial-mode ray entries. If more than this number of rays wish to enter the serial mode, they may be temporarily buffered, e.g. in a serial mode buffer 560, until space is available. A more in-depth embodiment of this approach is described later.

Referring back to FIG. 5, when the ray request processor 310 obtains ray requests, the SMRC provides the serial-mode ray requests. For each ray request, the SM RC identifies the serial-mode ray with the SID and the node (or list) using the Next Node Information.

When providing a serial-mode ray request to the RRP, an entry (data block) in the SIID may be reserved (in anticipation of the ray request intersecting more than $N_1$ bounding volumes).

If a ray request provided by the SMRC results in more than $N_1$ intersections (with bounding volumes identified by the node of the ray request) being identified, then the Next Node Information (for the SIIS entry associated with the serial-mode ray) is updated to identify the node(s) represented by $N_2$ of these bounding volumes. A new data block is generated and stored in the shared intersection information store 537, e.g. at the reserved SIIS entry, which points using pointer 62C to, if present, a previously most recently stored data block for that serial-mode ray (i.e. the most recently stored data block excluding the new data block stored in this process. The pointer for the SID entry of the serial-mode ray is also updated, to point to the most recently stored shared intersection information (i.e. point to the newly stored SIIS entry).

If a ray request provided by the SMRC results in between 1 and $N_1$ intersections (with bounding volumes identified by the node of the ray request) being identified, then the Next Node Information (for the entry associated with the serial-mode ray) is updated to identify the node(s) that represent(s) each intersected bounding volume (for that ray). If a SIIS entry was reserved, then this reservation for the ray request may be removed.

In some examples, if fewer than $N_1$ intersections are identified, then the intersection information for that ray (if present) is processed to identify one or more nodes for testing.

As previously explained, the intersection information may identify one or more nodes, each of which identify more than $N_1$ bounding volumes with which the relevant ray intersected. The intersection information also identifies for which of those bounding volumes a ray request has already been generated.

However, this information alone may be insufficient to determine which of the bounding volumes intersected by the ray have not had a ray request generated for them. This is because it may not be known which of the bounding volumes identified by the node intersects the ray. In other words, the node may have identified bounding volumes with which the ray did not intersect, but the results of which bounding volumes did or did not result in an intersection are not stored as part of the intersection information 62N.

To overcome this, the next ray request generated for the serial-mode ray may identify the node that identifies more than $N_1$ bounding volumes with which the relevant ray intersected. The result of this intersection test (which identifies the intersected bounding volumes) may then be processed together with the information identifying for which of those bounding volumes a ray request has already been generated, to determine a subsequent ray request for that ray (avoiding bounding volumes that have already been tested).

Thus, the elements of an already checked node may be retested. Although this may increase the number of intersection tests that are performed for processing a single ray, the proposed approach avoids the need to store data that specifically identifies a node that represents each intersected box (rather, identifying the "parent node" that identifies the intersected bounding volumes)

Preferably, as the amount of available or unused memory space in the shared intersection information store 537 decreases, the number of ray requests that are submitted to the ray request processor 310 by the serial-mode ray controller 535 also decreases. In other words, referring to FIG. 4, the number of ray requests obtained in step 410 may reduce in response to the amount of memory occupied by the intersection information increasing. This effectively reduces the likelihood that the shared intersection information store 537 will overflow.

This can be done using a gradual braking approach. In this approach, there may be a number of thresholds for the amount of storage capacity used and, each time a threshold is breached, fewer ray requests are submitted to the ray request processor (from the serial-mode ray controller 535). Thus, there may be a first and/or second predetermined threshold/percentage which, when breached or exceeded, results in fewer ray requests being obtained in step 410 (of FIG. 4).

A controlled braking avoids a cliff-edge in performance, and can reduce the likelihood that the serial-mode rays will be processed only one ray at a time (e.g. reduce the likelihood that the shared intersection information store will be permanently full).

Preferably, the ray requests that are allowed to proceed are based on the age of the serial-mode ray. In particular, the older the age of the serial-mode ray (in the serial-mode ray controller 535), the greater the likelihood that it will be submitted in a ray request to the ray request processor.

Accordingly, the serial-mode ray controller 535 may also store (for each serial-mode ray) time information indicative of a time since the serial-mode ray was first assigned an SID compared to other assigned SIDs. As an example, each entry in the SID store 536 may point to another, older entry in the SID store, to thereby indicate an age of the entries in the SID store 536.

To improve performance, in some embodiments, a ray request may be generated and obtained for a serial-mode ray where it is known that any identified intersections with the elements identified by the node of a serial-mode ray request (e.g. the elements branching off the node associated with the ray request) will not result in new ray requests being generated. For example, no new ray requests will be generated when the elements identified by a node comprise only primitives. In other words, the mechanism for limiting the number of generated ray requests can be bypassed for nodes known not to generate new ray requests. Thus, the limitation applied by the braking approach may only apply to ray requests for which the elements identified by the node of the ray request are bounding volumes, that is non-leaf nodes.

One implementation for carrying out this braking could be through use of two programmable thresholds and a final fixed level threshold. Each programmable threshold specifies the number of oldest serial-mode rays (or serial-mode ray requests) that can progress when the number of unused SIIS entries drops below the respective threshold. The final threshold specifies that only the oldest serial-mode ray may progress, i.e. have ray requests passed to and processed by the RRP.

The final threshold is based off the maximum depth constant the hardware supports (i.e. the maximum depth of the hierarchical acceleration structure). The final threshold may be set so that, when there is only this number of linked list stack entries available/free, only ray request(s) of the oldest serial-mode ray in the SID store are permitted to be passed to the RRP.

A hardware only approach for braking would be functional if only one threshold were to be used, where the threshold is based off the maximum depth of the hierarchical acceleration structure. However, in this case, the SIIS may fill with data for many partially complete serial-mode rays, meaning that a "bottleneck" is formed, in which only one serial-mode ray ever progresses at a time.

The disclosure recognizes that the final threshold can be avoided all together with appropriate braking (e.g. a gradual reduction in the number of serial-mode rays that progress) and therefore the average number of serial-mode rays active throughout the intersection testing procedure can increase.

In one example scenario: it can be assumed that each serial-mode ray requires, on average, 16 SIIS entries. In a scenario in which there is storage capacity for 2048 SIIS entries, and there is a maximum of 256 serial-mode rays stored the SIDS, an embodiment might implement two programmable braking thresholds for which: when 1024 SIIS entries are free/available, only 128 serial-mode rays may progress; when 512 SIIS entries are available, only allow 32 serial-mode rays may progress. There may also be a hardware limit (a "hard limit") which, when 64 linked list entries available, only allows 1 serial-mode ray (preferably the oldest serial-mode ray) to progress.

The SIIS does not have the storage capacity to hold 16 entries for all 256 serial-mode rays, because that would require 4096 SIIS entries. But now: the first 1024 SIIS entries will be used to hold 4 SIIS entries per serial-mode ray; the next 512 SIIS entries will be used to hold 4 entries for the oldest 128 serial-mode rays; the next 448 SIIS entries will be used to hold 14 entries for the oldest 32 serial-mode rays; and the final 64 SIIS entries will be usable to hold 64 entries for the oldest serial-mode ray.

In this way, no fewer than 22 entries are made available to the oldest 32 serial-mode rays, meaning that (on average) the processing rate is no less than 32 serial-mode rays at a time.

Thus, a gradual braking approach avoids the continual occupation of SIIS resource, and enables a consistent processing rate (of no less than a predetermined number of serial-mode rays at a time) to progress.

The proposed numbers and threshold are only exemplary, and the skilled person would be readily capable of adapting the proposed thresholds to suit a particular implementation. In some examples, a first threshold is reached when a first predetermined percentage, e.g. of between 50% and 80%, of the available memory for the (intersection) information is occupied. In some examples, a second threshold is reached when a second predetermined percentage, e.g. of between 70% and 90%, of the available information for the (intersection) information is occupied.

The proposed braking approach could also be used to reduce a number of ray requests obtained as the amount of available memory/storage for other forms of information for rays ("information relating to the one or more rays") decreases, e.g. reaches predetermined threshold(s). For instance, the proposed braking approach for reducing the number of ray requests obtained could be employed as the amount of available memory for storing ray requests decreases, e.g. exceeds different thresholds.

For instance, a first threshold may be reached when a first predetermined percentage, e.g. of between 50% and 80%, of the available memory for the information relating to the ray(s) is occupied. In some examples, a second threshold is reached when a second predetermined percentage, e.g. of between 70% and 90%, of the available information for the information relating to the ray(s) is occupied.

If performed, the proposed braking approach (reducing a number of ray requests obtained responsive to available memory) is performed during an iterative intersection testing process that is performed only after rays and a hierarchical acceleration structure have been defined. In other words, the proposed braking approach may be utilized during a process (e.g. process 400 of FIG. 4) that identifies intersections between predefined rays and a predefined hierarchical structure. In this way, the use of memory is not directly dependent upon the number of rays to be tested nor the format of the hierarchical structure. Rather, the number of ray requests obtained in each iteration of the ray intersection process is controlled.

Put another way, the iterative intersection testing process (or ray intersection process) performed by the system may be executed only after the rays and/or hierarchical acceleration structure have been defined and/or obtained by the system. In this way, the number of ray requests obtained is independent of the number of rays and/or the format of the hierarchical structure. This approach provides improved flexibility in performing the ray intersection process (e.g. allowing for unrestricted numbers of rays and unrestricted formats for the hierarchical acceleration structure) whilst taking memory usage into account.

Turning back to FIG. 5, the intersection testing system 500 may further comprise a serial-mode buffer 560. This may be a separate element, as illustrated, or may be integrated into the ray store 330. The serial-mode buffer 560 may receive information about rays that have been dropped by the ray request processor (e.g. if a memory buffer of the ray request processor overflows), i.e. store rays that wish to enter (i.e. be processed using) the serial mode. The serial-mode buffer 560 may then pass a stored ray to the serial-mode ray controller 535 when a serial-mode ray entry is available (e.g. when a previous serial-mode ray is complete).

The passing of stored rays from the serial-mode buffer 560 to the serial-mode ray controller 535 may be performed using a round robin approach. This ensures that, over time, all rays wishing to enter the serial mode will be passed to the serial-mode ray controller 535. An alternative approach could be to use a first-in first-out (FIFO) buffer.

The above disclosure proposes new approaches for handling intersections between rays and bounding volumes, i.e. how to generate one or more new ray requests based on intersections between rays and bounding volumes. An intersection between a ray and other type of element (e.g. a primitive or instance) may be handled in the conventional manner. By way of example, an intersection between a ray and a primitive may trigger a shader program, and an intersection with an instance may trigger the processing of the ray through a bottom-level hierarchical structure.

In particular examples, all predetermined values $N_1$, $N_2$, $N_3$ and $N_4$ (and $N_5$ if applicable) are equal to each other, and in further examples are all equal to one.

It has previously been described how all rays may be initially processed in a parallel-mode and, if the ray request processor overflows or runs out of memory, then rays currently undergoing processing may be dropped or flagged. Any dropped/flagged rays are re-processed in the serial-mode, such as using the serial mode approach previously described.

In some examples, a ray that has been flagged may continue to be processed in the parallel-mode (e.g. but dropping a certain number of ray requests that were generated at the time the ray request processor overflowed). There may be value in allowing the ray to continue, as this may cause the extents of the ray to be reduced if intersections with primitives are discovered (which, in some ray processing systems, may cause the ray to exit the intersection testing process).

A generic format for data entries in the SID store 536 and the shared intersection information store 537 has been previously described. A more precise example of a suitable format for data entries will be hereafter described with reference to Tables 1 and 2. Table 1 illustrates example parameters (e.g. fields) for a single data entry in the SID store 536. Table 2 illustrates examples parameters (e.g. fields for a single data entry in the shared intersection information store 537.

In the following description, it is assumed that the predetermined values $N_1$, $N_2$, $N_3$ and $N_4$ are all equal to 1. However, the skilled person would be capable of modifying the method for different predetermined values.

On initialization of a new serial-mode ray, the values of the following parameters, for an SID entry for that serial-mode ray, are set: STATE (to a value indicating the SID is in use); NODE ADDRESS (to identify the first node having elements against which the serial-mode ray is to be tested, i.e. the root node); TYPE (to identify the type of the node associated with NODE ADDRESS); OFFSET (initialized to 0); RID (to identify the ray ID of the serial-mode ray, stored in the ray information store). PRIORITY may also be updated (e.g. to point to a more recently stored SID entry for another ray, to identify the order of rays).

When the serial-mode ray undergoes intersection testing, the SM RC passes a ray request to the ray request processor, identifying the serial-mode ray and the node having elements against which the serial-mode ray is to be tested (from the NODE ADDRESS).

If the intersection testing identifies that the serial-mode ray intersects with no bounding volumes (or no bounding volumes at or beyond the offset identified by OFFSET), and the parameter POINTER VALID indicates that the SIID does store an entry associated with the SID entry, then the values of the following parameters for the SID entry are updated: NODE ADDRESS (to instead read the NODE ADDRESS of the entry in the SIIS to which the POINTER points); OFFSET (to the value of the OFFSET of the entry in the SIIS to which the POINTER points); TYPE (to the value of the TYPE of the entry in the SIIS to which the POINTER of the SID entry points) POINTER (to the value of the STACK POINTER) and POINTER VALID (to the value of STACK POINTER VALID). The relevant SIIS entry (i.e. the SIIS entry to which the POINTER pointed before being updated) can then be deleted or marked for deletion/overwriting.

If the intersection testing identifies that the serial-mode ray intersects with 1 bounding volume (at or beyond the offset identified by OFFSET), then the following parameters for the SID entry are updated: NODE ADDRESS (to identify the node that represents the intersected bounding volume), TYPE (to identify the type of elements identified by the identified node) and OFFSET (reinitialized to 0).

TABLE 1

| Parameter | Description |
| --- | --- |
| ID | Provides a unique identifier for the serial ray. This can be omitted and the address can be used as a unique identifier instead. |
| STATE | Identifies a state of the serial-mode ray |
| NODE ADDRESS | Identifies an address of the node for a next test to be performed for the ray |

TABLE 1-continued

| Parameter | Description |
|---|---|
| TYPE | Identifies the type of the elements of the node for the next test to be performed |
| OFFSET | Identifies (when used) how many intersections for elements of a node in the next test have already been processed |
| RID | The ray ID of the SID |
| POINTER | Points to an entry in the SIIS |
| POINTER VALID | Indicates whether the SIIS stores an entry associated with the SID |
| PRIORITY | Indicates a priority (e.g. age) of the serial ray |

If the intersection testing identifies that the serial-mode ray intersects with more than 1 bounding volume (at or beyond the offset identified by OFFSET), then a new SIIS entry is created for the serial-mode ray. The new SIIS entry has the following parameters set: NODE ADDRESS (to identify the node having more than 1 bounding volume with which the serial-mode ray is determined to intersect), TYPE (to identify the type of the elements of the node), STACK POINTER (to identify a most recently stored other SIIS entry for the serial-mode ray, if present) and STACK POINTER VALID (to identify whether or not the STACK POINTER points to another SIIS entry). The SID entry for the serial-mode ray is updated as follows: NODE ADDRESS (to identify a node that represents a first identified bounding volume beyond the OFFSET), TYPE (to identify the type of elements for the node newly identified by NODE ADDRESS), OFFSET (initialized at 0 for a new node), POINTER (to point to the newly stored SIID entry) and POINTER VALID (to indicate that a valid SI IS entry is pointed to). The OFFSET parameter for the newly stored SIIS entry is also updated.

TABLE 2

| Parameter | Description |
|---|---|
| NODE ADDRESS | Identifies an address of the node that identifies bounding volumes, for which not all intersections have generated a new ray request |
| TYPE | Identifies the type of the identified node |
| OFFSET | Identifies (when used) how many intersections for elements of the identified node have already been processed |
| STACK POINTER | Points to a next entry in a list of entries associated with the same SID |
| STACK POINTER VALID | Indicates whether the Stack pointer points to another entry in the SIIS |

Intersection testing systems according to the present disclosure may be provided as part of a ray tracing system. The ray tracing system may comprise one or more intersection testing systems, and may implement one or more shader programs. The ray tracing system may be provided as part of a graphics processing system.

Figure 7:
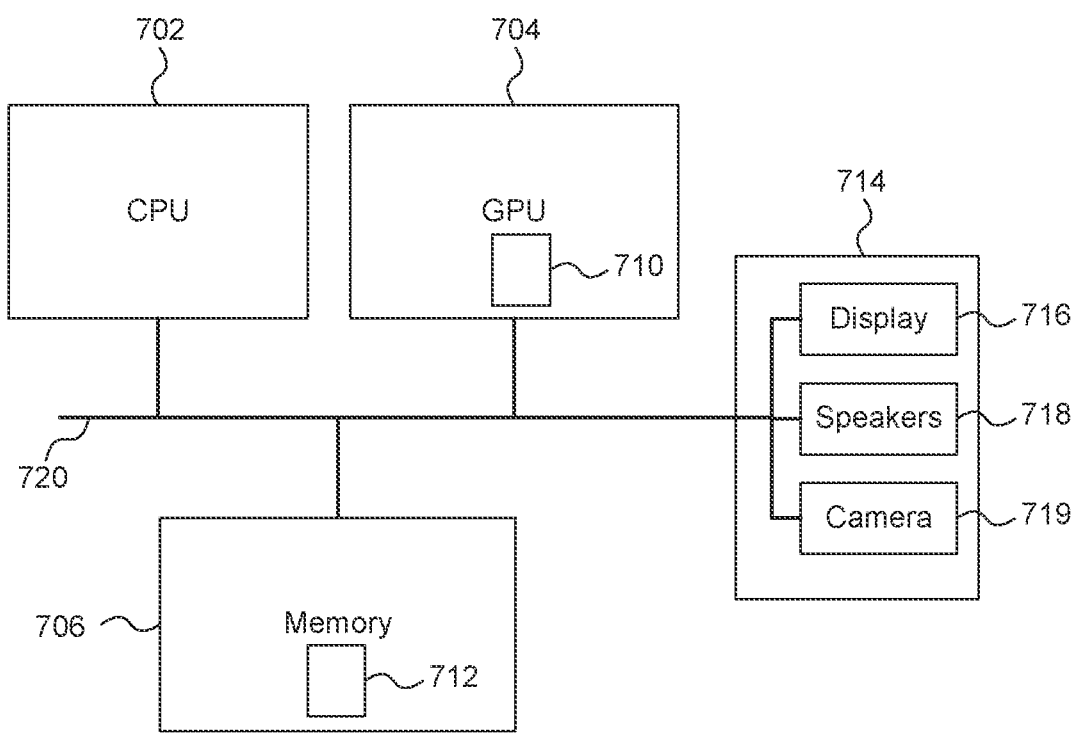
FIG. 7 shows a computer system in which a graphics processing system is implemented.

FIG. 7 shows a computer system in which such a graphics processing system may be implemented. The computer system comprises a CPU 702, a GPU 704, a memory 706 and other devices 714, such as a display 716, speakers 718 and a camera 719. A processing block 710 (corresponding to intersection testing system 300, 500) is implemented on the GPU 704. In other examples, the processing block 710 may be implemented on the CPU 702. The components of the computer system can communicate with each other via a communications bus 720. A store 712 (corresponding to memory 112) is implemented as part of the memory 706.

The intersection testing systems of FIGS. 3 and 5 were shown as comprising a number of functional blocks. This is schematic only and is not intended to define a strict division between different logic elements of such entities. Each functional block may be provided in any suitable manner. It is to be understood that intermediate values described herein as being formed by an intersection testing system need not be physically generated by the intersection testing system at any point and may merely represent logical values which conveniently describe the processing performed by the intersection testing system between its input and output.

The intersection testing systems described herein (and ray tracing systems and/or graphics processing systems incorporating them) may be embodied in hardware on an integrated circuit. The intersection testing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, Neural Network Accelerator (NNA), System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an intersection testing system (or ray tracing system or graphics processing system) configured to perform any of the methods described herein, or to manufacture an intersection testing system (or ray tracing system or graphics processing system) comprising any apparatus described herein. An integrated circuit definition dataset may be, for example, an integrated circuit description.

Therefore, there may be provided a method of manufac- turing, at an integrated circuit manufacturing system, a system (or ray tracing system or graphics processing system) as described herein. Furthermore, there may be provided an integrated circuit definition dataset that, when processed in an integrated circuit manufacturing system, causes the method of manufacturing a system (or ray tracing system or graphics processing system) to be performed.

An integrated circuit definition dataset may be in the form of computer code, for example as a netlist, code for config- uring a programmable chip, as a hardware description lan- guage defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level represen- tations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an inte- grated circuit so defined by the representation. As is typi- cally the case with software executing at a computer system so as to define a machine, one or more intermediate user steps (e.g. providing commands, variables etc.) may be required in order for a computer system configured for generating a manufacturing definition of an integrated cir- cuit to execute code defining an integrated circuit so as to generate the manufacturing definition of that integrated circuit.

An example of processing an integrated circuit definition dataset at an integrated circuit manufacturing system so as to configure the system to manufacture an intersection testing system (or ray tracing system or graphics processing system) will now be described with respect to FIG. 8.

Figure 8:
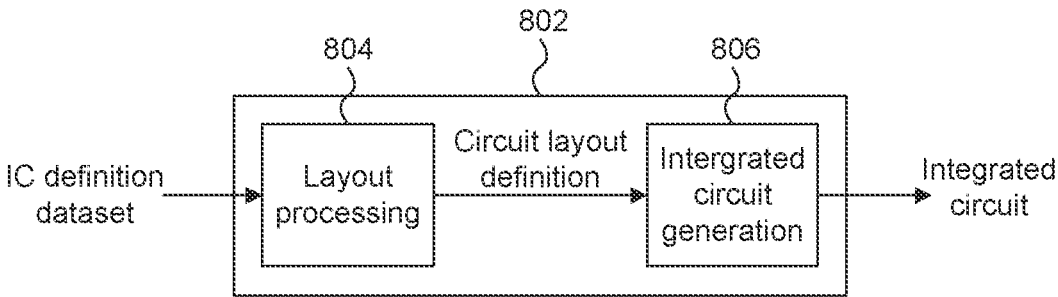
FIG. 8 shows an integrated circuit manufacturing system for generating an integrated circuit embodying a graphics processing system.

FIG. 8 shows an example of an integrated circuit (IC) manufacturing system 802 which is configured to manufac- ture an intersection testing system (or ray tracing system or graphics processing system) as described in any of the examples herein. In particular, the IC manufacturing system 802 comprises a layout processing system 804 and an integrated circuit generation system 806. The IC manufac- turing system 802 is configured to receive an IC definition dataset (e.g. defining an intersection testing system as described in any of the examples herein), process the IC definition dataset, and generate an IC according to the IC definition dataset (e.g. which embodies an intersection test- ing system as described in any of the examples herein). The processing of the IC definition dataset configures the IC manufacturing system 802 to manufacture an integrated circuit embodying an intersection testing system (or ray tracing system or graphics processing system) as described in any of the examples herein.

The layout processing system 804 is configured to receive and process the IC definition dataset to determine a circuit layout. Methods of determining a circuit layout from an IC definition dataset are known in the art, and for example may involve synthesizing RTL code to determine a gate level representation of a circuit to be generated, e.g. in terms of logical components (e.g. NAND, NOR, AND, OR, MUX and FLIP-FLOP components). A circuit layout can be deter- mined from the gate level representation of the circuit by determining positional information for the logical compo- nents. This may be done automatically or with user involve- ment in order to optimize the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo litho- graphic and chemical processing steps during which elec- tronic circuits are gradually created on a wafer made of semiconducting material. The circuit layout definition may be in the form of a mask which can be used in a lithographic process for generating an IC according to the circuit defi- nition. Alternatively, the circuit layout definition provided to the IC generation system 806 may be in the form of computer-readable code which the IC generation system 806 can use to form a suitable mask for use in generating an IC.

The different processes performed by the IC manufactur- ing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesizing RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an inter- section testing system (or ray tracing system or graphics processing system) without the IC definition dataset being processed so as to determine a circuit layout. For instance, an integrated circuit definition dataset may define the con- figuration of a reconfigurable processor, such as an FPGA, and the processing of that dataset may configure an IC manufacturing system to generate a reconfigurable proces- sor having that defined configuration (e.g. by loading con- figuration data to the FPGA).

In some embodiments, an integrated circuit manufactur- ing definition dataset, when processed in an integrated circuit manufacturing system, may cause an integrated cir- cuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialized fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing intersection testing between one or more rays and elements by nodes of a hierarchical acceleration structure, wherein:

a node identifies one or more elements for intersection testing, wherein at least some of the elements identified by the hierarchical acceleration structure are represented by a further node of the hierarchical acceleration structure;

wherein the computer-implemented method comprises iteratively performing a serial-mode ray intersection process of:

processing the one or more rays and the hierarchical acceleration structure to identify, for each ray, any intersections between the ray and the elements identified by one or more nodes of the hierarchical acceleration structure;

for each ray, in response to identifying that the ray intersects with more than a first predetermined number of elements represented by further nodes:

testing the ray against each of no more than the first predetermined number of elements; and generating and storing intersection information for the ray, the intersection information being usable to identify any further node that represents an element that was both identified as intersecting the ray and was not tested against the ray, wherein the intersection information comprises one or more sets of one or more data blocks, each set of data blocks representing a different ray, and wherein each data block identifies:

a node that identifies more than the first predetermined number of elements, each of which is represented by a further node, with which the respective ray is determined to intersect; and information identifying against which elements, represented by further nodes, of the node the respective ray has already been tested;

wherein the step of processing the stored intersection information comprises:

identifying a most recently stored data block for the ray;

processing the most recently stored data block to test the ray against an element represented by a node of the hierarchical structure against which the ray has not yet been tested and which was identified as intersecting the ray in the most recently stored data block; and updating the stored intersection information.

2. The computer-implemented method of claim 1 wherein the first predetermined number is 1.

3. The computer-implemented method of claim 1, wherein the intersection information identifies: a node identified as intersecting the ray; and information identifying for which further nodes, associated with elements identified by the node, the ray was tested against.

4. The computer-implemented method of claim 1, wherein the serial-mode ray intersection process further comprises, for each ray, in response to the number of intersections between the ray and elements represented by further nodes being zero:

determining whether the ray is associated with any stored intersection information; and in response to determining that the ray is associated with stored intersection information, processing the stored intersection information to test the ray against an element represented by a node of the hierarchical structure that was identified, in the stored intersection information as representing an element that intersected the ray and was not tested against the ray.

5. The computer-implemented method of claim 1, wherein the intersection information is stored in a memory pool shared by all rays.

6. The computer-implemented method of claim 1, wherein the serial-mode ray intersection process comprises, for each ray, in response to the number of intersections between the ray and elements represented by further nodes being between one and the first predetermined number inclusively, testing the ray against each intersected element represented by a further node.

7. The computer-implemented method of claim 1, wherein:

the serial-mode ray intersection process comprises obtaining one or more ray requests, each ray request identifying a ray and a node of the hierarchical structure identifying elements for which the ray of the ray request will undergo intersection testing; and processing the one or more rays and the hierarchical acceleration structure comprises processing the rays identified in the one or more ray requests to identify, for each ray in the one or more ray requests, any intersections between the ray and the elements identified by one or more nodes of the hierarchical acceleration structure.

8. An intersection testing system for performing intersection testing between one or more rays and elements identified by nodes of a hierarchical acceleration structure, wherein:

a node identifies one or more elements for intersection testing, wherein at least some of the elements identified by the hierarchical acceleration structure are represented by a further node of the hierarchical acceleration structure;

wherein the intersection testing system comprises an intersection testing processor configured to iteratively perform a serial-mode ray intersection process comprising:

processing the one or more rays and the hierarchical acceleration structure to identify, for each ray, any intersections between the ray and the elements identified by one or more nodes of the hierarchical acceleration structure; and for each ray, in response to identifying that the ray intersects with more than a first predetermined number of elements represented by further nodes:

testing the ray against each of no more than the first predetermined number of elements; and generating and storing intersection information for the ray, the intersection information being usable to identify any further node that represents an element that was both identified as intersecting the ray and was not tested against the ray, wherein the intersection information comprises one or more sets of one or more data blocks, each set of data blocks representing a different ray, and wherein each data block identifies:

a node that identifies more than the first predetermined number of elements, each of which is represented by a further node, with which the respective ray is determined to intersect; and information identifying against which elements, represented by further nodes, of the node the respective ray has already been tested;

wherein the step of processing the stored intersection information comprises:

identifying a most recently stored data block for the ray;

processing the most recently stored data block to test the ray against an element represented by a node of the hierarchical structure against which the ray has not yet been tested and which was identified as intersecting the ray in the most recently stored data block; and updating the stored intersection information.

9. A non-transitory computer readable storage medium having encoded thereon computer readable code configured to cause to be performed, when the code is run, a computer-implemented method of performing intersection testing between one or more rays and elements identified by nodes of a hierarchical acceleration structure, wherein:

a node identifies one or more elements for intersection testing, wherein at least some of the elements identified by the hierarchical acceleration structure are represented by a further node of the hierarchical acceleration structure;

wherein the computer-implemented method comprises iteratively performing a serial-mode ray intersection process of:

processing the one or more rays and the hierarchical acceleration structure to identify, for each ray, any intersections between the ray and the elements identified by one or more nodes of the hierarchical acceleration structure; and for each ray, in response to identifying that the ray intersects with more than a first predetermined number of elements represented by further nodes:

testing the ray against each of no more than the first predetermined number of elements; and generating and storing intersection information for the ray, the intersection information being usable to identify any further node that represents an element that was both identified as intersecting the ray and was not tested against the ray, wherein the intersection information comprises one or more sets of one or more data blocks, each set of data blocks representing a different ray, and wherein each data block identifies:

a node that identifies more than the first predetermined number of elements, each of which is represented by a further node, with which the respective ray is determined to intersect; and information identifying against which elements, represented by further nodes, of the node the respective ray has already been tested;

wherein the step of processing the stored intersection information comprises:

identifying a most recently stored data block for the ray;

processing the most recently stored data block to test the ray against an element represented by a node of the hierarchical structure against which the ray has not yet been tested and which was identified as intersecting the ray in the most recently stored data block; and updating the stored intersection information.

\* \* \* \* \*